United States Patent Office 2,872,497
Patented Feb. 3, 1959

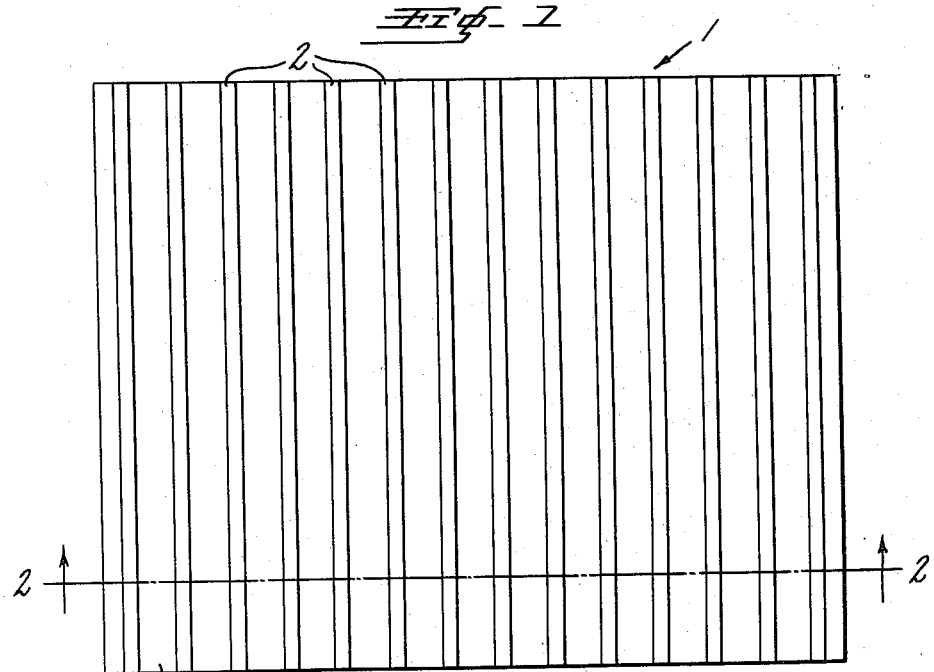
LIQUID PERMEABLE BATTERY SEPARATOR OF CELLULOSIC FIBROUS SHEET IMPREGNATED WITH C-STAGE PHENOL-FORMALDEHYDE RESIN COMBINED WITH A WETTING AGENT COMPOSED OF A METHYLOL DERIVATIVE OF A CONDENSATION PRODUCT OF ETHYLENE OXIDE WITH A para-ALKYLPHENOL
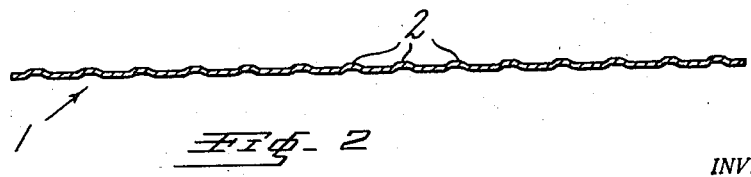
INVENTORS
OSCAR E. BECKVOLD, Jr.
PAUL F. HARTMAN

2,872,497

BATTERY SEPARATORS

Oscar E. Beckvold, Jr., Lakewood, R. I., and Paul F. Hartman, Packanack Lake, N. J., assignors to United States Rubber Company, New York, N. Y., a corporation of New Jersey Application October 28, 1955, Serial No. 543,303

2 Claims. (Cl. 136—146)

This invention relates to the use of certain compounds as permanent wetting agents in improved liquid-permeable electrical storage battery plate separators for lead-acid batteries. More particularly, the invention relates to cellulosic fiber sheet battery separators impregnated with phenol-formaldehyde resin, containing a permanent wetting agent which is a methylol compound chemically bound to the phenol-formaldehyde resin.

The invention is illustrated in the accompanying drawing, wherein:

Fig. 1 is a plan view of a battery separator of the invention; and,

Fig. 2 is a sectional view taken along the line 2—2 of Fig. 1.

Cellulosic fiber sheet battery separators of the kind to which this invention pertains are exemplified by U. S. Patent 2,543,137 to Uber, issued February 27, 1951, and the Uhlig et al. Patents 2,662,032; 2,662,106 and 2,662,-107, issued December 8, 1953, as well as 2,702,758, issued February 22, 1955. These patents represent improvements in the art of making battery separators. However, the methods described in these patents for making separators pose certain problems. To understand these problems it is necessary to discuss the manufacture of batteries briefly.

The conventional wet storage battery comprises a series of lead electrodes (plates) alternately spaced with separators to keep each plate from being shorted electrically by contact with the next one, all being immersed in aqueous sulfuric acid. The plates are charged during manufacture, either before or after being assembled in the battery case. The manufacturer prefers to charge the plates in their final positions, and to remove the electrolyte immediately after charging so that the dry battery can be shipped without danger of leakage of corrosive electrolyte and without discharging the plates during storage on the dealer's shelf. The electrolyte is then added to the fully charged battery by the dealer when he sells the battery to the customer.

The battery separators described by Uber could be safely immersed in the electrolyte while the plates were being charged originally, and, unlike the older wood separators, then could be dried without damage. However, both at the time of the original charging and when the dealer refilled the battery with electrolyte the latter wetted and penetrated the pores of the separators very slowly. Until the pores were substantially completely penetrated the battery could not operate satisfactorily. This problem was solved by incorporating a wetting agent into the separators before assembly of the battery. As a result of the presence of this wetting agent the electrolyte now penetrated the separators so rapidly that the difficulties formerly encountered were overcome.

However, the introduction of the wetting agent gave the manufacturer a new problem. Certain wetting agents used heretofore, such as those disclosed in the above-cited Uhlig et al. patents, are soluble in the electrolyte used during the first charging. Consequently, when this electrolyte is removed from the newly charged battery, at least some of the wetting agent is extracted from the separators. As the electrolyte is used repeatedly to charge new batteries the concentration of wetting agent in the electrolyte increases gradually until it becomes so high that the wetting agent injures the plates of the battery by causing active material to be dislodged and to fall down to the bottom of the cell where it is no longer useful and where it can accumulate to such an extent as to create a short circuit between the plates and undesirably lessen the service life of the battery.

We have now found that certain methylol compounds, which are themselves wetting agents or surfactants, can be incorporated during the manufacture of separators of the type referred to above and can be caused to react chemically with the phenolic resin in such a way as to retain permanently their wetting power in the finished separator. In practicing our invention these methylol compounds are dissolved in a solution of the A-stage phenolic resin used to impregnate the cellulosic fiber sheet in the manner described in the above-mentioned patents. During the conversion of the A-stage resin to the corresponding insoluble, infusible C-stage resin the methylol surfactant compound reacts with and becomes attached to the phenolic resin by primary chemical bonds. The finished separator of our invention, accordingly, is distinguished by the wetting agent being fixed and remaining active throughout the life of the battery, being not extractable by electrolyte. Thus the plates cannot be injured by accumulation of wetting agent in the acid. In addition, the separators are capable of being rapidly wetted by electrolyte at any time in the life of the battery.

The compounds which are reacted with the resin in practicing our invention are methylol derivatives of para-alkylphenyl ethers of ethylene oxide or propylene oxide, said ethers being known surface-active agents. These methylol derivatives are made by reacting the para-alkylphenyl ethers with formaldehyde and hydrochloric acid to effect chloromethylation of the ether, followed by hydrolysis of the chloromethyl (—CH$_2$Cl) group to a methylol (—CH$_2$OH) group. This hydrolysis is typically effected by heating with aqueous sodium hydroxide. The chemical structure of the resulting modified surfactant is believed to be (in the case of the ethylene oxide derivative):

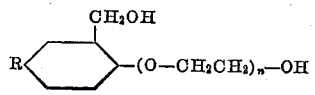

It is possible that some of the product is a di-methylol compound, having —CH$_2$OH groups in both the 2- and the 6-positions. In the case of the propylene oxide derivative, the formula is similarly:

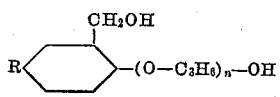

R in the formulas given above is an alkyl group having from 1 to 20 carbon atoms (e. g. ethyl, octyl) and $n$ is an integer typically having a value of from 3 to 30.

In subsequent discussion, for the sake of brevity, the methylolated 4-alkyl-phenyl ether of polyethylene oxide or polypropylene oxide will be called a "methylol derivative" or a "methylol compound." These two terms will refer to the 2-methylol compounds and/or the 2,6-bis-methylol compounds indiscriminately. The two terms will not be used to describe the A-stage and C-stage phenolic resins of the above-mentioned Uhlig et al. patents per se, even though it is, of course, well known that A-stage resins—and perhaps C-stage resins also— contain methylol groups. The Uhlig-type resins will be called "phenolic resins," "phenolformaldehyde resins," "resins," "A-stage resins," etc. Whenever the term "C-stage resin" is used, it will be understood that it refers to a resin which has been formed from an A-stage resin in the absence of a wetting agent used in this invention, unless the term is specifically qualified to the contrary.

The para-alkylphenyl ethers of polyethylene oxide or polypropylene oxide, used as starting materials for the preparation of the methylol derivatives, are well-known materials. Many such ethers of closely controlled but differing average molecular weight are commercially available and any of these commercially available ethers can be employed. Examples of such ethers are the "Igepals" described in booklet AP–45 of that title issued by the Antara Chemicals Division of General Aniline & Film Corp. These ethers are also described on pages 202 to 205 of the book, "Surface Active Agents" by Schwartz and Perry, published 1949 by Interscience Publishers, Inc., New York.

As is well known, these ethers are made by reacting the para-alkyl phenol with ethylene oxide or propylene oxide. The ethers vary in average molecular weight depending on the ratio of phenol to the alkylene oxide.

The new battery separators which contain the cured, i. e., C-stage, reaction products of the phenolic resin and the methylol compound have low electrical resistance in battery acid, which is essential to good battery service. The uniformity with which the battery acid is absorbed by these separators is outstanding. The resistance of the separators to oxidation loss is not affected by the wetting agents used in accordance with this invention.

In making a phenol:formaldehyde resin-impregnated cellulosic sheet separator according to our invention the amount of the wetting agent chemically combined with the phenolic resin in the finished separator can range from 3 to 10% of the weight phenolic resin content of the finished separator. The preferred range is 4–6%.

In practicing our invention, we dissolve the above-mentioned methylol compound in the impregnating solution, using an amount equal to from 3 to 10% of the weight of the A-stage phenolic resin content thereof. We then impregnate the cellulosic base sheet with this solution.

In the typical practice of our invention we take a bibulous cellulosic fibrous sheet containing at least 90% of alpha cellulose, having an air permeability (Gurley) of from 4 to 19 seconds (using a 5 ounce cylinder and a ¼ square inch orifice), and impregnate it with a solution of the phenol-formaldehyde resin and the methylol compound in such a way that from 20 to 50% by weight of C-stage resin, based on the dry cured sheet, is introduced into the sheet. When the resin is cured the fibers are protected against battery acid but the air permeability of the sheet is not materially lowered. We then dry the sheet, form ribs in the sheet if desired, and cure the sheet, typically at 300–600° F., to advance the phenolic resin to the C-stage. Simultaneous curing of the resin and reaction of the resin with the methylol compound take place. We can form the ribs by the embossing procedure shown in the above-mentioned Uhlig et al. Patents 2,662,106 and 2,702,758, in which case we prefer to dry the sheet so that it contains 10–25% of volatiles and then form protuberant ribs on one side with corresponding depressed portions on the other side by passing the sheet through cold embossing equipment. Alternatively, we can apply ribs of a paste material in accordance with copending application of Sillcox et al. Serial No. 433,208, filed May 28, 1954, these ribs of paste being applied to the flat sheet and subsequently hardened at the time of curing of the phenolic resin in the sheet. Or ribs can be formed in any other suitable way.

In making a phenol-formaldehyde resin-impregnated cellulosic sheet separator by the typical procedure described above we employ as a solvent for the A-stage resin any volatile, normally liquid organic solvent capable of dissolving the resin and the surface-active methylol derivative to form a homogeneous solution. Examples of suitable solvents are: alkanols having up to four carbon atoms per molecule, such as methanol, ethanol, isopropanol or butanol; acetone; miscible mixtures of such alkanols with water, and mixtures of acetone with water. It is essential that the A-stage resin and the methylol derivative dissolve in the solvent to form a single-phase solution. Although we can use the "absolute" (anhydrous) alkanols to dissolve the resin, for reasons of economy we prefer to use the commercially available forms of the alkanols which contain a small proportion of water. We often prefer to add water to the alkanol or acetone.

The thickness of the original fibrous sheet can vary widely, typically ranging from 0.015 to 0.06 inch. The sheet is used in a nominally dry condition, generally containing from 2 to 10% by weight of moisture. The sheet must exhibit uniform "formation," a term used in the paper industry to denote uniformity of fiber distribution and homogeneity of structure. This is very important since a sheet may be satisfactory in all other respects but if it is deficient in formation it will not give a satisfactory battery separator.

We can use any A-stage phenol-formaldehyde resin which is soluble in the solvent to give a solution containing from 13 to 50% by weight of non-volatile resin solids and which possesses adequate resistance to battery acid when cured to the C-stage. Those skilled in the phenol-formaldehyde resin art can readily prepare such a resin. Many such resins are well-known in the art, examples being those sold as "Durez 16056" and "Resinox 468."

The impregnation of the sheet is typically accomplished by first saturating it thoroughly by passing it through a bath of the resin solution containing the methylol derivative, followed by passage through ordinary squeeze rolls to remove excess solution and leave in the sheet an amount of solution ranging from 120 to 250 percent of the dry weight of the fiber. This amount is sufficient upon drying and curing to leave resin in the cured sheet in an amount equal to from 20 to 50 percent of the dry weight of the cured sheet. Because of the highly absorbent nature of the sheet, it will absorb a quantity of the solution in excess of that required, so that squeezing to remove the excess is necessary. Care should be taken in the squeezing step to limit the squeezing pressure so as to not injure the fibrous web.

For the manufacture of separators of the type with which our invention is particularly concerned, attention is directed to the aforementioned Uhlig et al. Patents Nos. 2,662,106 and 2,702,758, which are hereby incorporated by reference. Our invention is typically practiced in the same manner as is shown in those patents. No further addition of wetting agent or post-application of wetting agent is required.

Separators of the phenolic-resin impregnated cellulosic sheet type made by our invention have the following advantages over battery separators of this general type made by prior art practice:

A. Freedom from leaching out of wetting agent from separator into electrolyte. As a result, injury of the plates from excessive concentration of wetting agent in the electrolyte, and deficient wettability of the dry separators, are completely prevented.

B. Uniformity of absorption of battery electrolyte. Battery separators made from a porous cellulosic sheet protected with phenolic resin and containing a built-in surface-active agent of the type used in our invention show a high degree of uniformity of absorption of battery electrolyte. Each fiber is uniformly coated with resin and combined wetting agent, and uniform wetting results. There is a definite advantage in this method as compared with the two-stage method of applying the wetting agent, as shown in Uhlig et al. 2,662,032 and 2,662,107 because a second application of wetting agent requires standing to secure even distribution thereof and because the post-application introduces the extra expense of supplemental drying.

C. Rapid wettability or absorption of battery electrolyte which is particularly important in "dry charged" batteries. As is well-known, "dry charged" batteries comprise bone dry plates and separators which are prepared for use by addition of battery acid immediately before placement in service and require no further charging. Rapid wetting by battery acid is essential with such batteries to insure their ability to deliver the high amperage necessary for starting shortly after addition of the acid. Separators made by our invention are satisfactory in performance after 10 minutes' immersion in battery acid and this is ideal for a "dry charged" battery. In addition, the finished separators are dry so that they can be used directly in "dry charged" batteries. Our separators can also be used with wet installations.

D. The chemical resistance or oxidation resistance of battery separators made in accordance with our invention is not adversely affected even though wetting and penetration of an oxidizing acid, namely, the acid used in the oxidation test, is enhanced by the presence of our wetting agent.

In the drawing, 1 designates a resin-impregnated cellulosic sheet separator made in accordance with the present invention, and 2 denotes the integral embossed ribs thereof.

The following example illustrates the invention in more detail.

EXAMPLE

*Preparation of methylol derivative of para-alkylphenyl ether of polyethylene oxide*

The surface-active para-alkylphenyl ethers of polyethylene oxide employed in this example are typified by any of the following commercially available materials:

Triton X-100
Igepal CO430
Tergitol NPX
Synthetics B-79
Glim

To prepare the methylol derivative, first chloromethylate the surface active agent by dissolving 100 g. of it in 123 g. of concentrated hydrochloric acid. Add 10 g. of paraformaldehyde, and shake in a mechanical shaker overnight.

Alternatively, place of paraformaldehyde, use 15–20 g. of aqueous formalin and heat the reaction mixture in a flask to 50–60° C. for 3–4 hours while continually bubbling hydrogen chloride gas into the reaction mixture.

In either case, the reaction mixture containing the chloromethyl compound is then neutralized with sodium hydroxide, and an additional 25 g. excess of sodium hydroxide is adso added. The mixture is stirred mechanically overnight (18 hours), thus hydrolyzing the chloromethyl compound to the corresponding 2-methylol-4-alkylphenyl ether of polyethylene oxide (possibly with some methylol in the 6-position also, as previously noted). The product is removed from the aqueous solution by extracting with benzene and isolated by distilling off the solvent.

*Preparation of battery separator*

A cotton linters pulp sheet of 0.015" to 0.042" thickness, a Gurley porosity of 4 to 19 seconds (using a five ounce cylinder and a ¼ square inch orifice) and of uniform formation is saturated in a solution composed of the following:

| | Parts by weight |
|---|---|
| "Durez 16056" (phenol-formaldehyde resin, water soluble with a water dilutability as purchased of from 3:1 to 8:1, 70% non-volatiles | 720 |
| Isopropanol (91% isopropyl alcohol, 9% water) | 548.8 |
| Water | 164 |
| Methylol derivative of alkyl-phenyl ether of polyethylene oxide (modified Triton X-100) | 26.7 |

The resin solution contained approximately 35% by weight of resin solids, considering that the resin as purchased contained 70% solids.

The sheet was impregnated and processed into finished cured separators in the manner shown in the above-cited Uhlig et al. Patent 2,662,106. The resulting separators were eminently satisfactory and had all the advantages set forth above.

The electrical resistance and absorption characteristics of separators made in accordance with the invention with a typical methylol derivative surfactant in varying proportions (based on the solid phenolic resin content of the separator) are set forth in the following table. The bone dry phenolic resin content in all cases was 33% of the total separator weight.

| Unleached Samples: | | | |
|---|---|---|---|
| Percent Wetting Agent (Methylol derivative of Triton X-100) Based on Solids of Resin | 1.5 | 2.5 | 5.0. |
| Electrical Resistance—Ohms per Square Inch, 10 minute Acid Soak | .036 | .0405 | .0386. |
| Water Absorption, Time in seconds for 1 cc. distilled water to be absorbed | 900" | 900" | 54.1". |
| Leached Samples: | | | |
| Electrical Resistance—Ohms per Square Inch, 10 minute Acid Soak | .057 | .047 | .040. |
| Water Absorption, Time in seconds for 1 cc. distilled water to be absorbed | Did not wet. | Did not wet. | 1,900". |

In the leaching process, the separators were leached for 16 hours with water overflowing at the rate of 2.5 quarts per minute followed by drying under vacuum for 2 hours at 240° F. Separators made by our invention are satisfactory in performance after ten minutes immersion in battery acid. Our separators do not need to be conditioned for installation in the battery. The batteries may be assembled dry and kept dry indefinitely before addition of the battery acid. Our separators are eqally applicable for both wet and dry charge installations.

All electrical resistance values given herein were determined in the manner described in the industry bulletin titled, "A Method for Measuring the Electrical Resistance of Battery Separators," published in February 1953 by the United States Rubber Company.

Having thus described our invention, what we claim and desire to protect by Letters Patent is:

1. A liquid-permeable battery separator comprising a bibulous cellulosic air-permeable fibrous sheet having an alpha cellulose content of at least 90% and exhibiting uniform formation, the fibers of said sheet being coated with a C-stage phenol-formaldehyde resin chemically combined with a methylol derivative of a surface-active agent which is a condensation product of a para-alkylphenol with an alkylene oxide selected from the group consisting of ethylene oxide and propylene oxide and having the following structural formula:

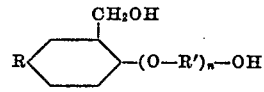

wherein R is an alkyl group having from 1 to 20 carbon atoms, R' is selected from the group consisting of $-CH_2CH_2-$ and $-C_3H_6-$ and $n$ is an integer having a value of from 3 to 30, whereby said surface active agent is firmly bound into said separator.

2. A separator as set forth in claim 1 wherein the amount of said methylol derivative is equal to from 3 to 10 percent by weight based on the weight of said C-stage phenol-formaldehyde resin, and the said alkylene oxide is ethylene oxide.

References Cited in the file of this patent

UNITED STATES PATENTS

| | | |
|---|---|---|
| 2,624,706 | Maxcy et al. | Jan. 6, 1953 |
| 2,662,032 | Uhlig et al. | Dec. 8, 1953 |
| 2,662,107 | Uhlig et al. | Dec. 8, 1953 |
| 2,702,758 | Uhlig et al. | Feb. 22, 1955 |

OTHER REFERENCES

Vogel, A. I.: "A Text-Book of Practical Organic Chemistry," Longmans, Green and Co., London, 1948, page 516.